United States Patent Office 3,248,411
Patented Apr. 26, 1966

3,248,411
PROCESS FOR THE CONVERSION OF HIGHLY ALKYLATED TIN COMPOUNDS INTO LOWER ALKYLATED TIN HALIDES
Wilhelm Paul Neumann and Gottfried Burkhardt, Giessen, Germany, assignors to Studiengesellschaft Kohle m.b.H., Mulheim (Ruhr), a German corporation
No Drawing. Filed Mar. 23, 1962, Ser. No. 182,095
Claims priority, application Germany, Mar. 28, 1961, St 17,633
9 Claims. (Cl. 260—429.7)

The manufacture of alkyl tin trihalides: $RSnX_3$ (X=Cl, Br, I) by the reaction of tetraalkyl compounds with tetrahalide tin compounds has been attempted in a similar manner to that used for the preparation of aromatic organo-tin compounds of the type $C_6H_5SnCl_3$. K. A. Kotscheskov reacted 3 or more mols tin tetrachloride with 1 mol tin tetraalkyl at 210° C. in a pressure tube in the hope of producing the desired alkyl tin trihalide according to the equation . Instead of the desired material, however, he obtained only dialkyl tin dichloride, together with unchanged tin tetrachloride. Later, others attempted to produce ethyl tin trichloride by boiling tetraethyl tin for 24 hours with about 9 times the molar amount of tin tetrachloride under reflux. However, only 15 percent of theory of the desired ethyl tin trichloride was obtained, and even this was contaminated by amounts of tin tetrachloride, in spite of fractionation. Apart from low yield, the process had the further serious disadvantage of involving the use of a large excess of tin tetrachloride which is extremely sensitive to moisture; in fact, three times the theoretical amount to be reacted was introduced. A complicated fractionation of the excess in the reaction product comprising a mixture of $(C_2H_5)_2SnCl_2$ and $(C_2H_5)_3SnCl$, was necessary for recovery.

Furthermore, in individual cases the production of alkyl tin trihalides according to the equation $$SnR_4 + SnX_4 \rightarrow RSnX_3 + R_3SnX$$

(R=methyl, n-butyl; X=Cl, I) has been achieved. This process has, however, the basic disadvantage that only half the amount of tin is obtainable in the form of the desired compound, while the other half is in the form of material of the type $R_3SnCl$, for which there is little demand. For this process, the use of precisely stoichiometric amounts of $SnR_4$ and $SnX_4$ is important, and the possible application of the process is limited. For these reasons there has as yet been no satisfactory process available for the production of ethyl, propyl and isobutyl tin trihalides such as the tribromides.

The subject of the present invention is a process for the conversion of alkylated tin compounds of the general formula $R_4Sn + R_3SnX$ into mixtures of alkylated tin halides of the general formula $R_2SnX_2 + RSnX_3$, wherein R reprents an alkyl radical and X a halogen atom, characterised in that one mol of a tin tetra-alkyl is reacted with two mols of a compound selected from the group consisting of tin-tetrachloride, -tetrabromide or -tetraiodide and the individual products recovered from the reaction mixture.

The general gross equation:

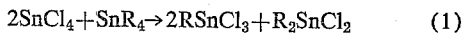

applies for the reaction according to the invention employing tin tetrachloride. An excess of $SnCl_4$ is not necessary, which considerably simplifies processing. In this manner, therefore, two thirds of the tin introduced can be obtained in the form of the desired compound. The $R_2SnCl_2$ resulting as side-product belongs to a group of materials representing a desirable starting material for numerous other processes—this is a further advance accruing from the process of the present invention. The reaction can be conducted in such a manner that no by-product apart from a dialkyl tin halide are formed. Advantageously, initial cooling is applied to avoid side-reactions. If desired compounds of the general formula $R_3SnX$ can also be reacted with a compound of the selected group as stated above to yield compounds $R_2SnX_2 + RSnX_3$.

In the process of the present invention the gross reaction according to Equation (1) mentioned above can be carried out in stages according to the process of the invention. The process of the invention, however, takes place in two reaction stages which can also be carried out independently of each other. These two reaction stages are represented in the following equations:

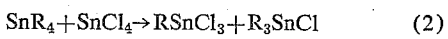  (2)

  (3)

The surprising advantage of the quantative formation of the end-product of the invention is due to the fact that in the process according to the invention it is possible to employ the $R_3SnCl$ formed according to Equation (2) for the alkylation of a further mol of $SnCl_4$ according to Equation (3), without the reaction.

  (4)

which proceeds more favourably under other conditions, being apparent. This naturally leads to the possibility of conducting reaction (3) on its own and thus converting a compound $R_3SnCl$, which occurs as by-product in another process into the more valuable $R_2SnCl_2$ with further production of $RSnCl_3$.

The optimal yield according to equation (1) of 66.7% $RSnCl_3$ can be achieved if the reaction temperature is at first maintained at least as low as possible. However, the temperature can be raised, thus decreasing the reaction time, although this must be paid for by somewhat lower yields of reaction product $RSnCl_3$. The cause of this is the rival reaction (4). However, this is no necessarily a disadvantage as the higher proportion of $R_2SnCl_2$ may often be desirable.

The reaction speed of the process of the invention is governed by the nature of the radical R in the tin tetraalkyl employed as reactant. In general, it may be said that the reaction is slower when long or branched chain alkyl radicals are present than when shorter, unbranched chain alkyl radicals are involved.

For example, the reaction speed in the case of the isobutyl radical is lower than in that of the the n-butyl radical. Stage 1 of the process of the invention according to Equation 2 represents an exothermic reaction that generally takes at the most between 5 and 15 minutes. It is preferable to ensure that for the first few minutes of the reaction the reaction vessel is maintained at temperatures between 0 and 20° C.

The second stage of the process of the invention in any case proceeds more slowly than the first. If tin trimethyl chloride, for example, is employed the reaction is completed within 60 minutes at temperatures between 0 and 20° C. At temperatures below −20° C., no perceptible reaction is effected. Where R=n-butyl, no worthwhile reaction is effected below 0° C. and complete conversion takes from 2 to 3 hours even at 100° C. If the corresponding isobutyl compound is employed, conversion will take as much as 20 hours at 150° C. and 0.5 hours at 200° C.

If an excess of $SnCl_4$ is always provided (this is easily arranged by adding $SnR_4$ dropwise to 2 mols of $SnCl_4$) the whole reaction Equation 1 can be effected at higher temperatures right from the start—see Example 3. In this case, the side reaction (4) causes a somewhat lower yield of the desired RSnX$_3$ but the time taken by the whole reaction can be considerably shortened.

According to the invention, the tin tetrahalides can also be employed in the form of their complex compounds, for example, with ethers. Separation of the mixtures obtained —RSnX$_3$+R$_2$SnX$_2$ is easily effected, for example, by means of distillation. The working-up is thus obviously simple. For many purposes, however, it may be of advantage to use the mixture in the form in which it is obtained in the process just described. Solvents or diluents are not generally necessary, but have no harmful effect.

Alkyl tin trihalides are increasing in importance, for example, for the manufacture of other tri-functional organo-tin compounds and for the preparation of polymers containing Sn.

The following examples are illustrative of the practice of this invention:

EXAMPLE 1

260.5 grammes (1 mol) SnCl$_4$ are gradually stirred in with 117.4 grammes (0.5 mol) Sn(C$_2$H$_5$)$_4$ in the absence of moisture and at 0° C. After the strongly exothermic main reaction has ended, stirring is continued for a few hours at room temperature, causing part of the

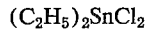

formed to precipitate. The C$_2$H$_5$SnCl$_3$ is directly distilled off from the reaction mixture, preferably over a filter column in vacuo, in order to avoid decomposition. The distillate, as shown by gas chromatography, has a degree of purity of 98 percent and usually over 99.5 percent. Boiling point$_1$=38° C.

The (C$_2$H$_5$)$_2$SnCl$_2$ remains in the flask in the form of a colourless crystalline mass and can subsequently be driven off without a column by means of a broad air-cooler. Boiling point$_{12}$=107°.

Yields:

(1) 253.8 grammes C$_2$H$_5$SnCl$_3$ containing 66.5 percent of the tin present in the reaction.

*Analytical data.*—Found: 41.8% Cl, 46.5% Sn. Calculated: C$_2$H$_5$SnCl$_3$: 41.8% cl. 46.7% Sn.

(2) 123.2 grammes (C$_2$H$_5$)$_2$SnCl$_2$ containing 33.2 percent of the tin present in the reaction.

*Analytical data.*—Chlorine content—28.6%. Calculated—28.6%.

EXAMPLE 2

Reaction is effected with the quantities stated in Example 1, but the SnCl$_4$ is dissolved in 250 ccs. benzene and the reaction temperature is initially maintained between 10 and 20°. Later, the temperature is raised to 50° in order to accelerate the reaction. After the benzene has been distilled off, fractionation can be effected, as stated. Result and yields are the same as in Example 1. Instead of benzene, a high-boiling mineral oil may also be used, and this will remain behind after the diethyl tin dichloride has been driven off.

EXAMPLE 3

The same quantities as in Example 1 are employed, but the tin tetrachloride is heated to about 110° C. (bath temperature 120° C.) before the drop-wise introduction of the Sn(C$_2$H$_5$)$_4$. The actual temperature of the mixture itself during the reaction is maintained at 110° C. to 120° C. The reaction is complete 5 minutes after this introduction has ended. Working up is effected as described in Example 1, with the following results:

(1) 242.3 grammes C$_2$H$_5$SnCl$_3$ with 63.6% of the tin present in the reaction (chlorine content 41.8%); and (2) 135.8 grammes (C$_2$H$_5$)$_2$SnCl$_2$ with 36.4% of the tin present in the reaction (chlorine content 28.5%).

EXAMPLE 4

11.7 grammes (0.05 mol) Sn(C$_2$H$_5$)$_4$ are gradually added drop-wise to 40.9 grammes (0.1 mol) molten tin tetrachloride diethyl etherate at 120° C. During the reaction the ether is liberated and distills off. Working up in the usual manner yields:

(1) 24.1 grammes C$_2$H$_5$SnCl$_3$ with 63% of the tin present (chlorine content 41.7%) and (2) 13.4 grammes (C$_2$H$_5$)$_2$SnCl$_2$ with 36% of the tin present (chlorine content 28.5%).

EXAMPLE 5

52.1 grammes (0.2 mol) SnCl$_4$ are heated to 100° C. and 34.6 grammes (0.1 mol) tetra-n-butyl tin are gradually added in the absence of moisture, thorough stirring being continued throughout. The temperature is maintained at 100° C. for about 2 hours longer and the butyl tin trichloride (boiling point$_{0.1}$=45° C.) is then distilled off. Dibutyl tin dichloride remains and can subsequently also be distilled off, boiling point$_{0.1}$=92–94° C.

Yields:

(1) 53.4 grammes n-C$_4$H$_9$SnCl$_3$ with 63% of the tin introduced (found: 3.8% Cl and 42.0% Sn. Calculated for C$_4$H$_9$SnCl$_3$: 38.6% Cl and 42.0% Sn).

(2) 29.9 grammes (n-C$_4$H$_9$)$_2$SnCl$_2$ with 33% of the tin introduced (found: 23.3% Cl and 39.1% Sn. Calculated for C$_8$H$_{18}$SnCl$_2$: 23.3 and 39.1%).

EXAMPLE 6

Reaction is effected as in the previous example, except that 57.1 grammes (0.1 mol) tetra-n-octyl tin are employed in place of the tetrabutyl tin. The yield of octyl tin trichloride and dioctyl tin dichloride is the same, as may be confirmed by gas chromatography.

EXAMPLE 7

70.4 grammes (0.27 mol) SnCl$_4$ are heated in an oil bath until boiling vigorously. 46.9 grammes (0.135 mol) tetra-isobutyl tin are gradually stirred into this. The temperature is simultaneously raised until it reaches 200° C. and is kept at that level for 30 minutes. The reaction is now complete, the mixture having become somewhat cloudy on account of small quantities of decomposition products. The isobutyl tin trichloride (boiling point$_{0.1}$=37° C.) is separated from the di-isobutyl tin dichloride (boiling point$_{0.1}$=58–59° C.) by means of fractional distillation.

Yields:

(1) 71.8 grammes iso-C$_4$H$_9$SnCl$_3$ with 62.8% of the tin present in the mixture (38.7% Cl and 42.1% Sn);

(2) 39.7 grammes (iso-C$_4$H$_9$)$_2$SnCl$_2$ with 32.3% of the tin present (23.5% Cl and 39.3% Sn).

EXAMPLE 8

Reaction is effected as described in Example 7 except that throughout the whole process the temperature is 100–120° C. A reaction time of about 24 hours is now necessary, but there is no decomposition and the mixture remains colourless and clear.

EXAMPLE 9

177.0 grammes (0.404 mol) SnBr$_4$ are heated to 100° C. in the absence of moisture and stirred thoroughly. 47.5 grammes (0.202 mol) tetra-ethyl tin are then gradually added drop-wise. When the final reaction, also effected at 100° C., is complete, the total time taken being about 10 hours, the diethyl tin dibromide (boiling point$_{0.1}$=70–71° C.) is distilled over a good column after the ethyl tin tribromide (boiling point$_{0.1}$=46° C.)

Yields:

(1) 156.0 grammes C$_2$H$_5$SnBr$_3$ with 66.6% of the tin present (61.7% Br and 30.8% Sn. Calculated for C$_2$H$_5$SnBr$_3$: 61.9 and 30.6%).

(2) 67.2 grammes (C$_2$H$_5$)$_2$SnBr$_2$ with 33% of the tin present (47.9% Br and 35.2% Sn. Calculated for C$_4$H$_{10}$SnBr$_2$: 47.5% and 35.3%).

EXAMPLE 10

130.2 grammes (0.5 mol) SnCl₄ are gradually mixed at 0–20° C. with 120.7 grammes (0.5 mol) (C₂H₅)₃SnCl, thorough stirring being continued throughout. The temperature is then raised to about 60° C., thus completing the reaction.

Fractionated distillation yields:

(1) 124.8 grammes C₂H₅SnCl₃ with 49% of the tin present (chlorine content 41.8%), boiling point$_1$=36–38° C.;

(2) 121.8 grammes (C₂H₅)₂SnCl₂ with 49.2% of the tin present (chlorine content 28.6%), boiling point$_{12}$=107° C.

EXAMPLE 11

17.9 grammes (0.1 mol) tetramethyl tin are gradually stirred into 52.2 grammes (0.2 mol) SnCl₄ dissolved in 200 ccs. benzene. The reaction is complete after 30 minutes, the reaction product, as shown by gas chromatography, consisting solely of CH₃SnCl₃ and (CH₃)₂SnCl₂ in the molar ratio 2:1.

EXAMPLE 12

72.2 grammes (0.22 mol) tri-n-butyl tin chloride are introduced drop-wise into 58.5 grammes (0.22 mol) of SnCl₄ at 100° C. with good stirring. The mixture is maintained for 1 hour at 100° C. and the reaction products separated by fractional distillation.

Yields:

(1) 60.2 grammes n-monobutyl tin trichloride containing 48.0% of the tin present; boiling point$_{0.1}$=44–45° C.;

(2) 65.5 grammes n-dibutyl tin dichloride with 48.7% of the tin present; boiling point 90–95° C.

EXAMPLE 13

26.0 grammes (0.08 mol) tri-isobutyl tin chloride are introduced drop-wise into 21.2 grammes (0.08 mol) boiling tin tetrachloride and the mixture then heated for about 30 minutes at 200° C. Reaction can also be effected at 90° C. within three days.

Yields:

(1) 20.5 grammes iso-monobutyl tin trichloride (40.5% of the tin present) boiling point$_{0.1}$=36–37° C.

(2) 23 grammes iso-di-isobutyl tin dichloride (47.3% of the tin present) boiling point$_{0.1}$=57–59° C.

EXAMPLE 14

57.7 grammes (0.202 mol) tri-ethyl in bromide are gradually introduced into 89.5 grammes (0.202 mol) of tin tetrabromide heated to 100° C. After 15 hours the reaction products are separated by fractional distillation over a good column.

Yields:

(1) 78 grammes mono-ethyl tin tribromide (49.8% of the tin present) boiling point$_{0.1}$=46° C.;

(2) 67.2 grammes di-ethyl tin dibromide (49.4% of the tin present) boiling point$_{0.1}$=69–71° C.

It will be appreciated that various modifications in the foregoing details may be made without departing from the nature and scope of the invention, and it is to be understood that the invention is in no way limited to the aforesaid details, save as defined by the appended claims.

We claim:

1. A process for the production of mixtures of alkylated tin halides of the formula $R_2SnX_2$ and $RSnX_3$, wherein R is alkyl and X is halogen, by conversion of a member of the group of alkylated tin compounds of the formula $R_4Sn$ and $R_3SnX$, and R and X being as just defined, which comprises reacting said group member with a tin tetrahalide using two mols of said tin tetrahalide for each mol of tin tetraalkyl and one mol of tin tetrahalide for each mol of trialkyl tin halide present, and recovering the alkylated tin halides thereby formed.

2. Process according to claim 1, which comprises effecting said reaction with initial cooling whereby side reactions are avoided.

3. Process according to claim 1 which comprises using said tin tetrahalide in the form of a complex compound thereof with an ether of the formula $R_2O$ wherein R represents alkyl.

4. Process according to claim 1 wherein the alkyl radicals of the tin tetra-alkyl present in said starting mixture having from 1 to 3 carbon atoms and said reaction is carried out at a temperature of 0–20° C.

5. Process according to claim 1 wherein the alkyl radicals of the tin tetra-alkyl present in said starting mixture contain at least 4 carbon atoms and said reaction is carried out without cooling at temperatures of up to 250° C.

6. Process according to claim 1 wherein the alkyl radicals of the tin tetra-alkyl present in said starting mixture contain at least 4 carbon atoms and said reaction is carried out at temperatures under 200° C. for a period of time sufficient to complete the conversion.

7. Process according to claim 1 which comprises forming said starting mixture by drop-wise addition of 1 mol of tin tetra-alkyl to 2 mols of tin tetrahalide.

8. A process for production of a mixture of alkylated tin halides of the formula $R_2SnX_2 + RSnX_3$ wherein R is alkyl and X is halogen which comprises reacting a trialkyl tin halide with a tin tetrahalide in mol ratios of 1:1 and recovering the mixture of alkylated halides thereby formed.

9. A process for the production of a mixture of alkylated tin halides of the formula $R_2SnX_2 + RSnX_3$ wherein R is alkyl and X is halogen which comprises in a first-stage reacting a tin tetra-alkyl with tin tetrahalide in a molar ratio of 1:1 and thereafter in a second stage reacting the $R_3SnX$ formed with tin tetrahalide in a molar ratio of 1:1 and recovering the mixture of alkylated tin halides thereby formed.

References Cited by the Examiner

FOREIGN PATENTS 739,883   11/1955   Great Britain.

OTHER REFERENCES

Ingham et al., "Chem. Rev." 60, No. 5 (October 1960), (pp. 459–539; pp. 483–487 and 525–539 needed).

TOBIAS E. LEVOW, *Primary Examiner.*